R. Humphreys,
Tuning Musical Instruments.
N°24,392. Patented June 14, 1859.
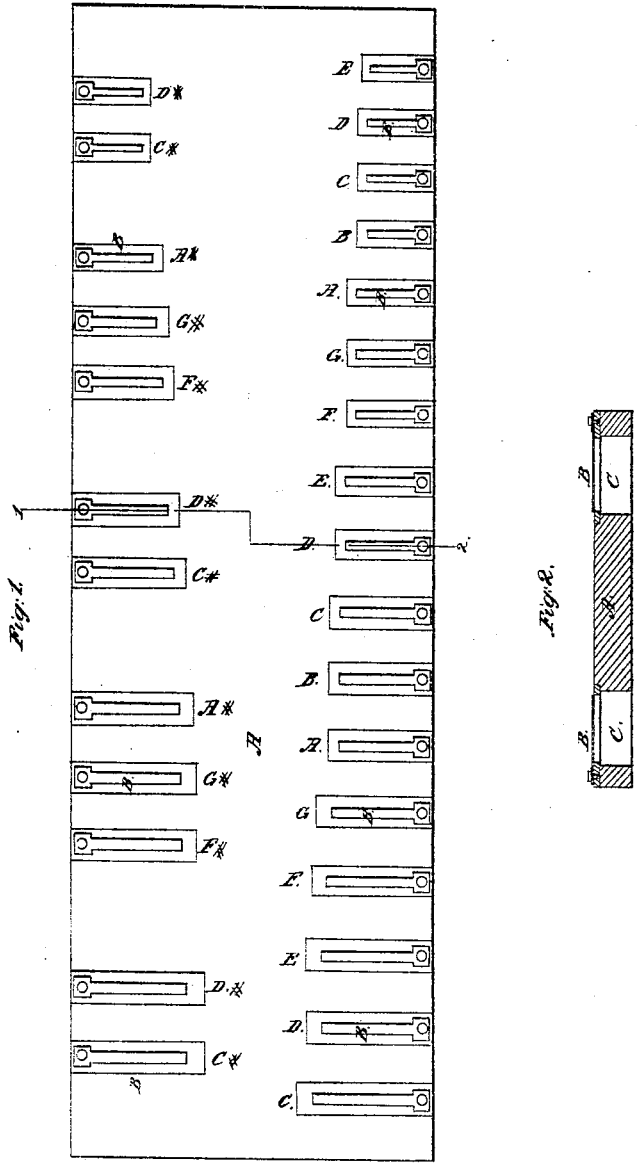
Witnesses:
B. G. Payne,
M. A. Byrne
Inventor:
R. Humphreys

UNITED STATES PATENT OFFICE.

RICHARD HUMPHREYS, OF JONESBORO, TENNESSEE.

TUNING-KEYBOARD.

Specification of Letters Patent No. 24,392, dated June 14, 1859.

*To all whom it may concern:*

Be it known that I, RICHARD HUMPHREYS, of Jonesboro, in the county of Washington and State of Tennessee, have invented a new and useful compound tuning-keyboard embracing the scale of musical notation for the purpose of aiding musicians to tune and keep in tune their own musical instruments with accuracy and facility; and I do hereby declare that the following is a full, clear, and exact description of the same, reference being had to the accompanying drawings, making part of this specification.

Figure 1 is a top or bird's-eye view of a compound key-board, embracing reeds representing 2¼ octaves of natural scale and 2¼ octaves of the scale of sharps. Fig. 2 is a transverse section of ditto.

Similar letters refer to corresponding parts.

The nature of this invention and improvement consists in combining on a neat rectangular board, any desired number of octaves of properly tuned reeds, similar to those used in melodeons, to represent a corresponding number of octaves of the natural scale of musical notation for white keys of a pianoforte, and another set of correctly tuned reeds, representing the semi-tones of the octaves first named, for the black keys of the pianoforte, in such a manner as to enable the musician, by comparing the tones of his instrument with those of the key-board, to detect and correct the least departure from the correct tone.

To enable others skilled in the art to make and use my invention, I will proceed to describe its construction and operation.

The reeds embraced on the key-board A, represented in the drawings include those only which represent the keys of pianoforte, used by musicians in what they technically term laying the bearings, that is, 2¼ octaves of natural scale ascending from C to E, and 2¼ octaves of the scale of sharps # ascending from D to E #. In case it is desired, however, other compound keyboards may be constructed, containing reeds representing the ascending and descending keys of the general scales, upon the same system as that observed in the keyboard represented in Fig. 1.

The keyboard A, may be made of any suitable wood or other material, and from four to six inches wide, from ten to twelve inches long, and about one-half an inch thick, which will be full sufficient to contain reeds representing 2¼ octaves of the general scale of music. This board is provided with the required number of reeds B, of different sizes to represent the octaves named, corresponding with those employed in melodeons and other reed instruments of music, which reeds are dovetailed in corresponding mortises in the top surface of the key boards, near the edges of the same, the set near one edge representing the natural scale, and the rear set of twos and threes representing the scale of flats and sharps, and each vibrating portion being situated over a slot or mortise C, corresponding with it in its oblong form and extending entirely through the boards, for the transmission of sound and its free vibration.

The several reeds B of the keyboard are to be put in perfect tune, according to the rules of musical science, which will enable any musician, by accompanying the tones of his musical instrument with those of the tuning keyboard, to detect the least departure from the correct tone; and if one or more of the notes of his instrument be out of tune, when compared with the tuning keyboard, all that is necessary for the musician to do, is to bring the notes of his musical instrument in perfect unison with those of the keyboard, when the reeds are vibrated by a pointed instrument, and his instrument will be in perfect tune.

The compound tuning keyboard formed as above, will remain in tune for an indefinite period, if properly and carefully handled, and in addition to serving as a tuning keyboard will also answer purpose of instructing pupils in music, by bringing before them in a convenient and simple form the concords of a pianoforte necessary to learn them the entire scale.

I claim—

As a new article of manufacture the before described compound tuning reeds necessary to represent the corresponding keys in the general scale of musical notations, substantially as before described.

RICHARD HUMPHREYS.

Witnesses:
B. G. PAYNE,
M. A. PAYNE.